(12) United States Patent
Iwamura

(10) Patent No.: US 12,242,776 B2
(45) Date of Patent: Mar. 4, 2025

(54) SIMULATION DEVICE, NON-TRANSISTORY COMPUTER READABLE RECORDING MEDIUM, AND SIMULATION METHOD FOR COMPREHENSIVELY SIMULATING BEHAVIOR OF SYSTEM

(71) Applicant: OMRON Corporation, Kyoto (JP)

(72) Inventor: Shintaro Iwamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/836,989

(22) Filed: Jun. 9, 2022

(65) Prior Publication Data
US 2022/0300680 A1 Sep. 22, 2022

Related U.S. Application Data

(63) Continuation of application No. 17/251,211, filed as application No. PCT/JP2019/025318 on Jun. 26, 2019.

(30) Foreign Application Priority Data

Jul. 19, 2018 (JP) ................................. 2018-135730

(51) Int. Cl.
*G06F 30/20* (2020.01)
(52) U.S. Cl.
CPC .................................... *G06F 30/20* (2020.01)
(58) Field of Classification Search
CPC . B25J 9/1605; B25J 9/1671; G05B 19/41885; G05B 2219/32357; G06F 2119/14; G06F 30/20
See application file for complete search history.

(56) References Cited

U.S. PATENT DOCUMENTS

2006/0074526 A1* 4/2006 Watanabe .............. B25J 9/1697
  700/245
2007/0282485 A1* 12/2007 Nagatsuka ......... G05B 19/4069
  700/245

(Continued)

FOREIGN PATENT DOCUMENTS

CN   102909725   2/2013
CN   106873549   6/2017

(Continued)

OTHER PUBLICATIONS

"Office Action of Europe Counterpart Application", issued on May 13, 2024, p. 1-p. 8.

(Continued)

*Primary Examiner* — Nithya J. Moll
(74) *Attorney, Agent, or Firm* — JCIPRNET

(57) ABSTRACT

Provided is a configuration which enables behaviors to be comprehensively simulated even for a system where a certain external force is applied to a workpiece. This simulation device includes: a workpiece conveyance simulator that calculates a state of the workpiece conveyance device; a workpiece behavior simulator that calculates an external force applied to the workpiece based on the state of the workpiece conveyance device and calculates the state of the workpiece based on the calculated external force; and an information management part that generates virtual space information that reflects the state of the workpiece conveyance device and the state of the workpiece.

9 Claims, 11 Drawing Sheets

(56) References Cited

U.S. PATENT DOCUMENTS

| | | | |
|---|---|---|---|
| 2007/0293986 A1* | 12/2007 | Nagatsuka | B25J 9/1671 |
| | | | 700/245 |
| 2008/0013825 A1 | 1/2008 | Nagatsuka et al. | |
| 2013/0218542 A1 | 8/2013 | Yerli | |
| 2016/0011588 A1* | 1/2016 | Takahashi | B25J 9/1674 |
| | | | 700/112 |
| 2016/0288194 A1* | 10/2016 | Buchner | B25J 19/007 |
| 2018/0111268 A1 | 4/2018 | Atohira et al. | |

FOREIGN PATENT DOCUMENTS

| | | |
|---|---|---|
| CN | 106873550 | 6/2017 |
| CN | 106896790 | 6/2017 |
| CN | 107984475 | 5/2018 |
| CN | 108000524 | 5/2018 |
| JP | 2009289156 | 12/2009 |
| JP | 2013004060 | 1/2013 |

OTHER PUBLICATIONS

"Office Action of China Counterpart Application", issued on Nov. 29, 2023, with English translation thereof, p. 1- p. 17.

* cited by examiner

SIMULATION DEVICE, NON-TRANSISTORY COMPUTER READABLE RECORDING MEDIUM, AND SIMULATION METHOD FOR COMPREHENSIVELY SIMULATING BEHAVIOR OF SYSTEM

CROSS-REFERENCE TO RELATED APPLICATION

This application is a continuation application of the U.S. patent application Ser. No. 17/251,211, filed on Dec. 11, 2020, which is a 371 application of the International PCT application serial no. PCT/JP2019/025318, filed on Jun. 26, 2019, which claims the priority benefit of Japan Patent Application No. 2018-135730, filed on Jul. 19, 2018. The entirety of each of the above-mentioned patent applications is hereby incorporated by reference herein and made a part of this specification.

TECHNICAL FIELD

The present technology relates to a simulation device, a simulation program, and a simulation method that are capable of estimating the behavior of a workpiece disposed in a virtual space.

RELATED ART

Simulation using a computer is applied to various technical fields. By using such a simulation, it is possible to conduct various pre-studies even in a state in which an actual device does not exist. As an example of using such a simulation for factory automation (FA), Japanese Patent Laid-Open No. 2016-042378 (Patent literature 1), for example, discloses an integrated simulation of a mechanical system including a visual sensor in a real space corresponding to a virtual photographing part.

SUMMARY OF THE INVENTION

The integrated simulation disclosed in Patent literature 1 above virtually images a virtual workpiece disposed on a virtual conveyor by a virtual visual sensor. The position of the virtual workpiece is uniquely determined by the movement of the virtual conveyor. In reality, there are not only systems in which a workpiece is conveyed by a conveyor but also systems in which the position of a workpiece is changed by some kind of actuator or the like. Patent literature 1 discloses nothing about simulation of such a system.

One purpose of the present technology is to provide a configuration capable of comprehensively simulating the behavior of a system in which some kind of external force is applied to a workpiece.

A simulation device according to one embodiment includes: a first simulator, calculating behavior of one or multiple workpieces disposed in a virtual space; a measurement part, carrying out a measurement on a virtual image generated by imaging the virtual space by a virtual camera disposed at an arbitrary viewpoint position in the virtual space; a second simulator, calculating, based on an operation command generated in response to a workpiece measurement result from the measurement part, behavior of a robot conveying the workpieces disposed in the virtual space; and an image generation part, generating an image in which the virtual space is visualized.

According to this disclosure, a simulation can be realized in which the processing for calculating the behavior of the one or multiple workpieces disposed in the virtual space, the processing for carrying out the measurement on the virtual image and the processing for calculating the behavior of the robot conveying the workpieces disposed in the virtual space based on the operation command generated in response to the workpiece measurement result are linked with each other. Accordingly, a simulation can be realized in which the behavior of each workpiece is reproduced.

In the above disclosure, the simulation device may further include a third simulator that calculates behavior of a workpiece conveyance device applying an external force to the one or multiple workpieces whose behavior is calculated by the first simulator. According to this disclosure, since the behavior of the workpiece conveyance device that determines the external force applied to each workpiece can also be reproduced, the behavior of each workpiece can be reproduced more accurately.

In the above disclosure, the simulation device may further include a virtual imaging part that manages the virtual camera disposed in the virtual space and generates the virtual image in response to the viewpoint position and a field of view of the virtual camera. According to this disclosure, since image measurement can be reproduced after the virtual camera is disposed at the arbitrary position in the virtual space, an evaluation can also be realized in which the position of the virtual camera is changed.

In the above disclosure, the first simulator may calculate and update a position and posture of each workpiece for each predetermined time step. According to this disclosure, the behavior of the workpiece can be reproduced for each time step.

In the above disclosure, the first simulator may respond to a change operation on a position or characteristic of an arbitrary workpiece at arbitrary time, and continue to calculate the behavior of the one or multiple workpieces in accordance with the position or characteristic after change. According to this disclosure, arbitrary trial and error such as changing the behavior of a specific workpiece can be easily realized.

According to another embodiment of the present technology, a simulation program for causing a computer to execute a simulation is provided. The simulation program causes the computer to execute: a step of calculating behavior of one or multiple workpieces disposed in a virtual space; a step of carrying out a measurement on a virtual image generated by imaging the virtual space by a virtual camera disposed at an arbitrary viewpoint position in the virtual space; a step of calculating, based on an operation command generated in response to a measurement result obtained by carrying out the measurement, behavior of a robot conveying the workpieces disposed in the virtual space; and a step of generating an image in which the virtual space is visualized.

According to this disclosure, a simulation can be realized in which the processing for calculating the behavior of the one or multiple workpieces disposed in the virtual space, the processing for carrying out the measurement on the virtual image and the processing for calculating the behavior of the robot conveying the workpieces disposed in the virtual space based on the operation command generated in response to the workpiece measurement result are linked with each other. Accordingly, a simulation can be realized in which the behavior of each workpiece is reproduced.

According to still another embodiment of the present technology, a simulation method executed on a computer is provided. The simulation method is executed by the computer and includes: a step of calculating behavior of one or multiple workpieces disposed in a virtual space; a step of carrying out a measurement on a virtual image generated by imaging the virtual space by a virtual camera disposed at an arbitrary viewpoint position in the virtual space; a step of calculating, based on an operation command generated in response to a measurement result obtained by carrying out the measurement, behavior of a robot conveying the workpieces disposed in the virtual space; and a step of generating an image in which the virtual space is visualized.

According to this disclosure, a simulation can be realized in which the processing for calculating the behavior of the one or multiple workpieces disposed in the virtual space, the processing for carrying out the measurement on the virtual image and the processing for calculating the behavior of the robot conveying the workpieces disposed in the virtual space based on the operation command generated in response to the workpiece measurement result are linked with each other. Accordingly, a simulation can be realized in which the behavior of each workpiece is reproduced.

According to the present technology, a configuration can be provided capable of comprehensively simulating the behavior of a system in which some kind of external force is applied to a workpiece.

DESCRIPTION OF THE EMBODIMENTS

Figure 1:
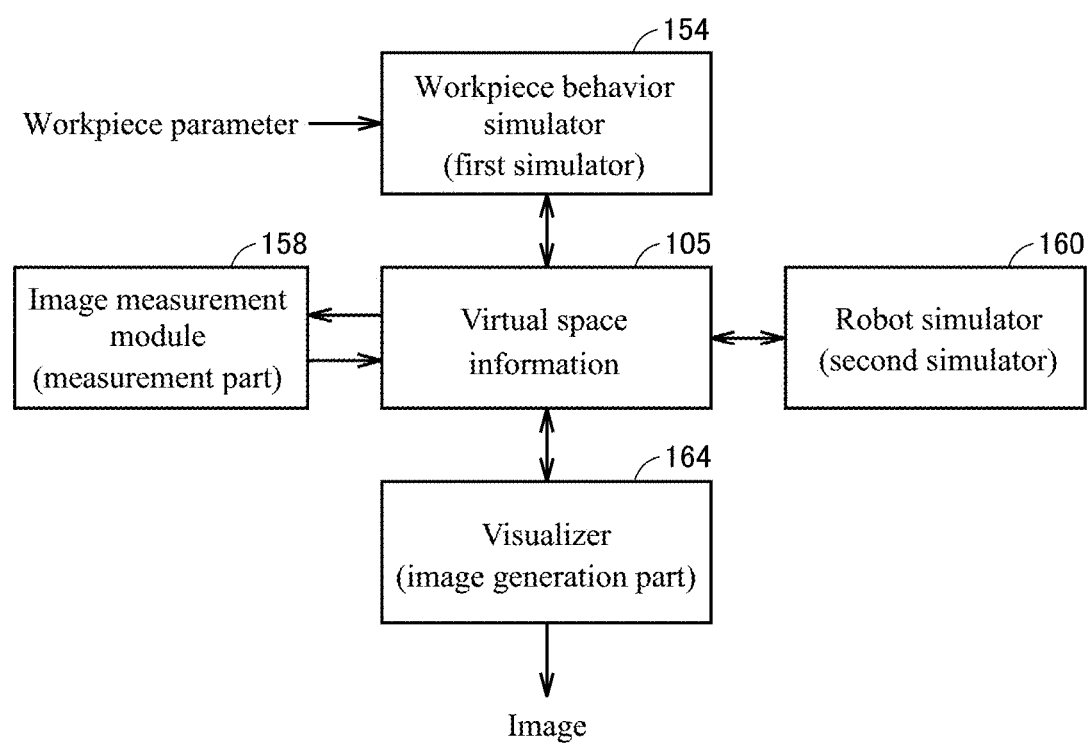
FIG. 1 is a schematic view showing an application example of a simulation device according to the present embodiment.

Embodiments of the present invention are described in detail with reference to the drawings. Moreover, the same or equivalent portions in the drawings are denoted by the same reference numerals, and description thereof will not be repeated.

A. Application Example

First of all, one example of a situation in which the present invention is applied is described.

A simulation device 1 according to the present embodiment is capable of comprehensively simulating the behavior of a system in which some kind of external force is applied to a workpiece. Typically, the simulation device 1 is applicable to an application in which a workpiece is conveyed by applying an external force thereto by a workpiece conveyance device as described later, a virtual image obtained by imaging the conveyed workpiece is subjected to a measurement, and the workpiece is picked up by a robot based on a result of the measurement.

FIG. 1 is a schematic view showing an application example of the simulation device 1 according to the present embodiment. Referring to FIG. 1, the simulation device 1 includes virtual space information 105 that defines a virtual space and an object disposed in the virtual space. By calculating the behavior of each object in the virtual space, the content of the virtual space information 105 is updated as appropriate.

The simulation device 1 includes a workpiece behavior simulator 154 calculating the behavior of one or multiple workpieces disposed in the virtual space. The workpiece behavior simulator 154 corresponds to a first simulator. The workpiece behavior simulator 154 estimates the behavior of each workpiece present in the virtual space based on a workpiece parameter.

The simulation device 1 includes an image measurement module 158 carrying out a measurement on a virtual image generated by imaging the virtual space by a virtual camera disposed at an arbitrary viewpoint position in the virtual space. The image measurement module 158 corresponds to a measurement part. That is, the image measurement module 158 is a kind of visual sensor for the visual space.

The simulation device 1 includes a robot simulator 160 calculating, based on an operation command generated in response to a workpiece measurement result from the image measurement module 158, the behavior of a robot conveying the workpieces disposed in the virtual space. The robot simulator 160 corresponds to a second simulator.

The simulation device 1 includes a visualizer 164 generating an image in which the virtual space is visualized. The visualizer 164 corresponds to an image generation part.

By mutual cooperation between these components and modules, even if an actual system does not exist, it is possible to accurately estimate the behavior of a workpiece and each device that may occur when the workpiece is processed by the actual system.

B. Target System Example

Next, one example of a system to be simulated by the simulation device 1 according to the present embodiment will be described.

Figure 2:
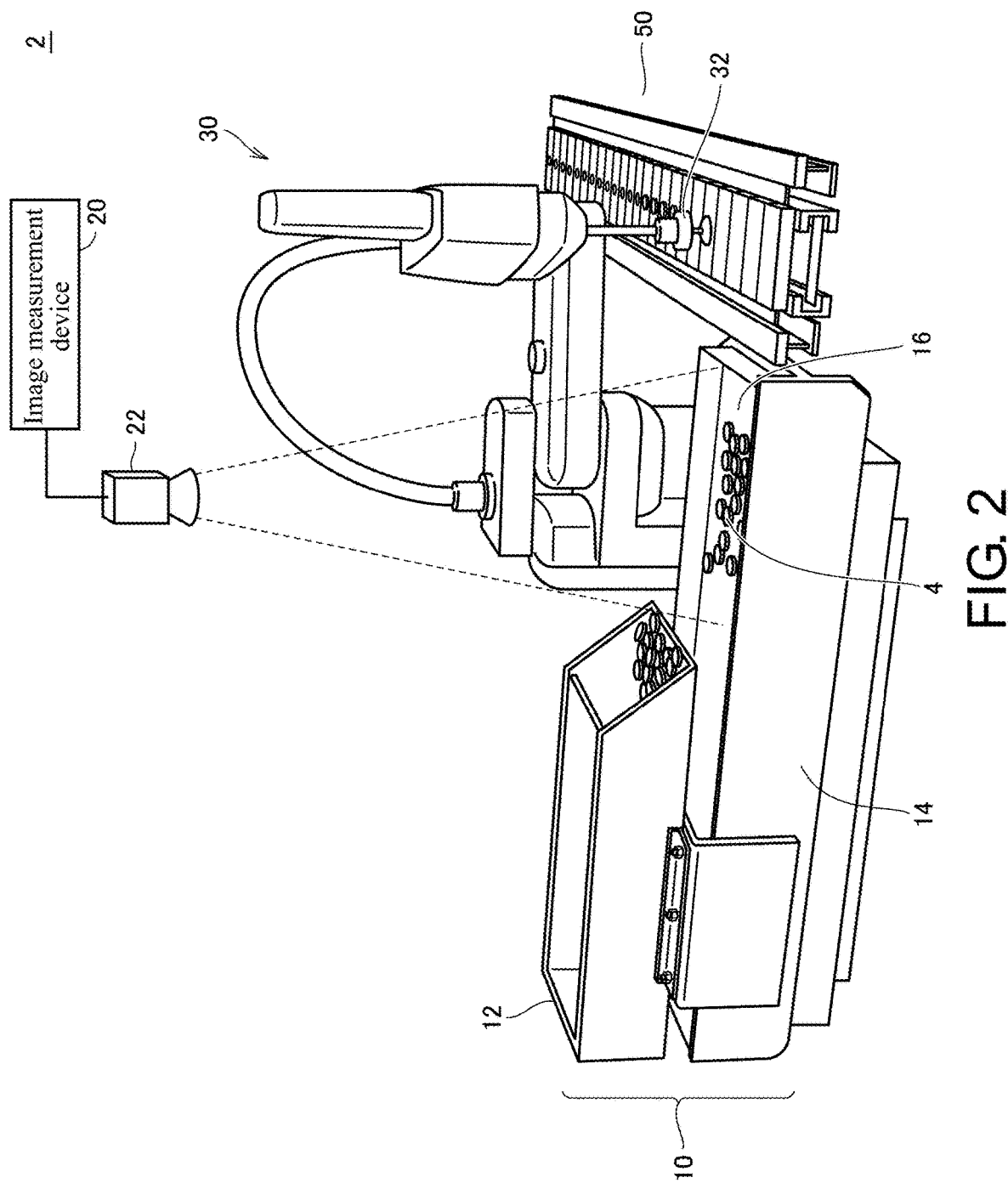
FIG. 2 is an external view showing one example of a workpiece conveyance system to be simulated by the simulation device according to the present embodiment.

FIG. 2 is an external view showing one example of a workpiece conveyance system 2 to be simulated by the simulation device 1 according to the present embodiment. Referring to FIG. 2, the workpiece conveyance system 2 includes a workpiece conveyance device 10, an image measurement device 20 connected to a camera 22, a robot 30, and a conveyor 50.

The workpiece conveyance device 10 includes a workpiece supply part 12 and a workpiece conveyance part 14. The workpiece supply part 12 holds multiple workpieces 4 in an accommodation part, and supplies some of or all of the workpieces held in the accommodation part to a conveyance surface 16 of the workpiece conveyance part 14 by vibrating on a regular basis or in response to some kind of event. The workpiece conveyance part 14 is also capable of vibrating on a regular basis or in response to some kind of event, and, by applying an external force to the workpieces 4 disposed on the conveyance surface 16, changes an arrangement position and posture of each workpiece 4.

The camera 22 is disposed so that at least a part of the conveyance surface 16 of the workpiece conveyance part 14 falls in a field of view. The image measurement device 20 measures the position and posture of the workpieces 4 disposed on the conveyance surface 16 by carrying out a measurement on an image acquired by imaging by the camera 22. By vibration of the workpiece conveyance part 14 on a regular basis or in response to an event, the position and posture of each workpiece 4 are appropriately changed, increasing the probability of properly measuring the workpiece 4 by the image measurement device 20.

Based on a measurement result (position and posture) of the workpieces 4 from the image measurement device 20, the robot 30 sucks any of the measured workpieces 4 by a suction part 32 disposed at an arm tip. Then, the robot 30 conveys the sucked (picked) workpiece 4 to the conveyor 50 and disposes (places) it at a predetermined position on the conveyor 50. The operation of the robot 30 in the workpiece conveyance system 2 is also referred to as a pick-and-place operation.

Basically, a conveyance surface of the conveyor 50 moves at a constant speed, and the workpiece 4 disposed on the conveyance surface is conveyed to a downstream processing process at a constant speed.

Figure 3:
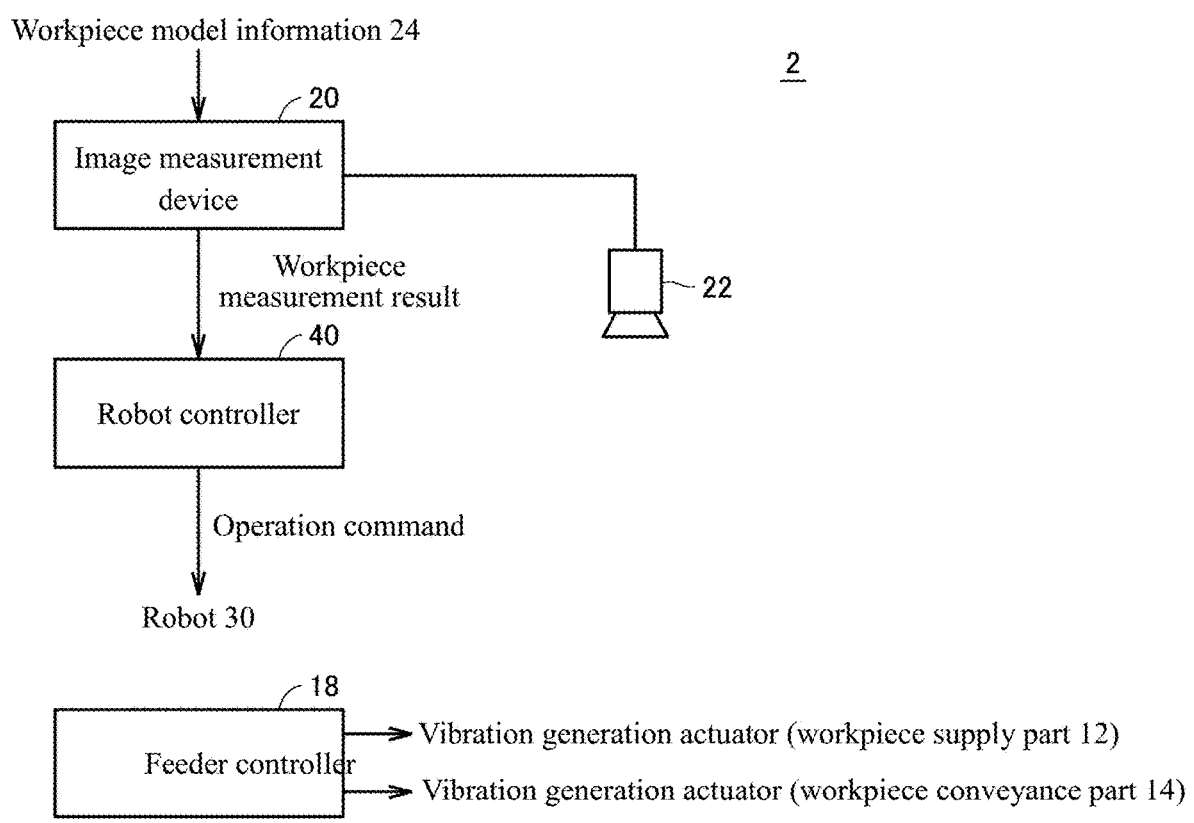
FIG. 3 is a schematic view illustrating a control function for realizing the workpiece conveyance system shown in FIG. 2.

FIG. 3 is a schematic view illustrating a control function for realizing the workpiece conveyance system 2 shown in FIG. 2. Referring to FIG. 3, the workpiece conveyance system 2 has the image measurement device 20 connected to the camera 22. Based on preset workpiece model information 24, the image measurement device 20 carries out a measurement on an image captured by the camera 22, thereby outputting a workpiece measurement result (including the measurement result of the position and posture of each workpiece).

The workpiece conveyance system 2 further has a robot controller 40. The robot controller 40 acquires the position and posture of a workpiece to be picked based on the workpiece measurement result from the image measurement device 20, and gives an operation command to the robot 30 based on the acquired information.

The workpiece conveyance system 2 further has a feeder controller 18. The feeder controller 18 drives the workpiece device supply part 12, which is a vibration generation actuator, on a regular basis or in response to some kind of event. Similarly, the feeder controller 18 drives the workpiece conveyance part 14, which is a vibration generation actuator, on a regular basis or in response to some kind of event.

In the following, as a typical example, a case is described where the simulation device 1 according to the present embodiment reproduces with high precision the operation or behavior of each device of the workpiece conveyance system 2 and the workpiece 4 shown in FIG. 2 and FIG. 3.

C. Hardware Configuration

Next, one example of hardware configuration of the simulation device 1 according to the present embodiment will be described.

Figure 4:
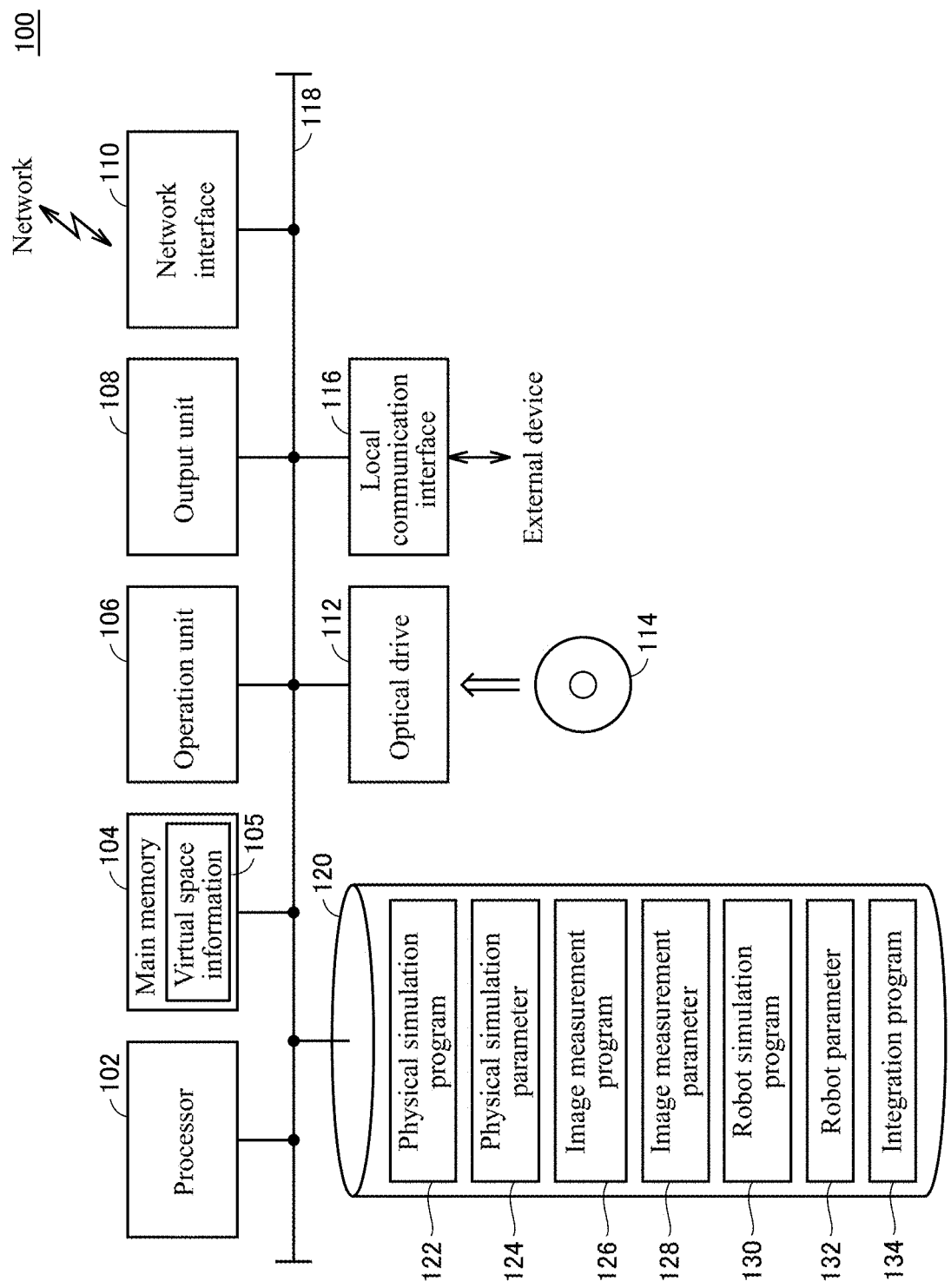
FIG. 4 is a schematic view showing one example of a hardware configuration for realizing the simulation device according to the present embodiment.

FIG. 4 is a schematic view showing one example of a hardware configuration for realizing the simulation device 1 according to the present embodiment. The simulation device 1 is realized by execution of a program necessary for an information processing device 100 as shown in FIG. 4.

The information processing device 100 includes, as main components: a processor 102, executing an operating system (OS) and various programs as described later; a main memory 104, providing a work area for storing data necessary for program execution on the processor 102; an operation unit 106 (operation reception part), receiving a user operation on a keyboard or a mouse or the like; an output unit 108, outputting a processing result of a display, various indicators, a printer or the like; a network interface 110, connected to a network; an optical drive 112; a local communication interface 116, communicating with an external device; and a storage 120. These components are connected so that data can be communicated via an internal bus 118 or the like.

The information processing device 100 has the optical drive 112. Various programs are read from a computer-readable recording medium 114 such as an optical recording medium (for example, Digital Versatile Disc (DVD) or the like) that non-transiently stores a computer-readable program and are installed on the storage 120 or the like.

The various programs executed by the information processing device 100 may be installed via the computer-readable recording medium 114, and may also be installed in a form of being downloaded from a server device or the like on a network. In addition, there are also cases where a program related to functional safety evaluation according to the present embodiment is realized in a form of using a part of a module provided by the OS.

The storage 120 is composed of, for example, a hard disk drive (HDD) or flash solid state drive (SSD) or the like, and stores a program executed by the processor 102. Specifically, the storage 120 includes, as simulation programs for realizing simulations according to the present embodiment, a physical simulation program 122, an image measurement program 126, a robot simulation program 130, and an integration program 134.

The physical simulation program 122 calculates the behavior of the workpiece conveyance device 10 and the behavior of the workpiece 4 influenced by the workpiece conveyance device 10. For the physical simulation program 122, a physical simulation parameter 124 is given which includes a parameter defining the behavior of the workpiece conveyance device 10 and a parameter defining the weight or shape or the like of the workpiece 4. A value of the physical simulation parameter 124 may be appropriately changed by a user operation or the integration program 134 or the like.

As the physical simulation parameter 124, CAD data of the workpiece conveyance device 10 and the workpiece 4 may be used. By using the CAD data, the behavior of an actual device can be reproduced more accurately.

The image measurement program 126 carries out substantially the same measurement as that of the image measurement device 20 on a virtually captured image that reflects the position and posture of each workpiece 4 that are calculated by the physical simulation program 122. For the image measurement program 126, an image measurement parameter 128 is given which includes a parameter necessary for the measurement in the image measurement device 20.

The robot simulation program 130 functions as a simulator reproducing the behavior of the robot 30. Based on a measurement result calculated by execution of the image measurement program 126, the robot simulation program 130 reproduces the pick-and-place operation performed by the robot 30 on the workpiece 4. For the robot simulation program 130, a robot parameter 132 is given which includes a parameter necessary for reproducing the behavior of the robot 30.

The integration program 134 executes processing for mutual cooperation between the physical simulation program 122, the image measurement program 126, and the robot simulation program 130. Specifically, the integration program 134 typically generates and updates the virtual space information 105 that describes a state of an object of the virtual space on the main memory 104. The physical simulation program 122, the image measurement program 126 and the robot simulation program 130 execute processing of the respective simulations with reference to the virtual space information 105, and reflect necessary information in an execution result in the virtual space information 105. By the function provided by the integration program 134, the behavior and processing by the workpiece conveyance system 2 including the workpiece conveyance device 10, the image measurement device 20 and the robot 30 are reproduced.

FIG. 4 shows an example of realizing the simulation device 1 by a single information processing device 100. However, multiple information processing devices may also be linked to realize the simulation device 1. In this case, a part of the processing necessary for realizing the simulation device 1 may be executed by the information processing device 100, and the remaining processing may be executed by a server (cloud) or the like on a network.

FIG. 4 shows an example in which the simulation device 1 is realized by executing one or multiple programs by the processor 102. However, a part of the processing and function necessary for realizing the simulation device 1 may be implemented using an application specific integrated circuit (ASIC) or a field-programmable gate array (FPGA) or the like.

D. Functional Configuration

Figure 5:
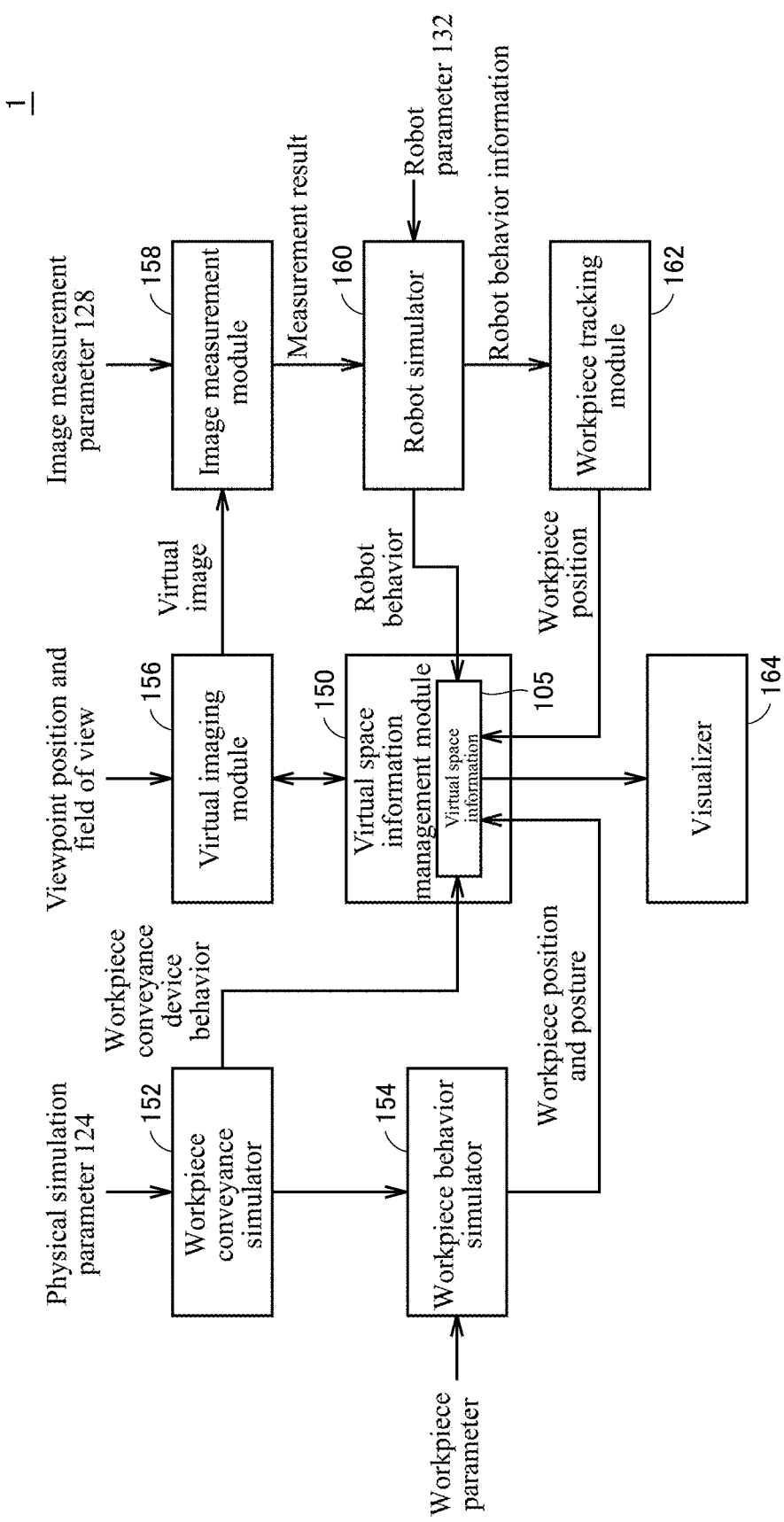
FIG. 5 is a schematic view showing one example of a functional configuration for realizing the simulation device according to the present embodiment.

Next, one example of functional configuration of the simulation device 1 according to the present embodiment will be described. FIG. 5 is a schematic view showing one example of a functional configuration for realizing the simulation device 1 according to the present embodiment. Each functional configuration shown in FIG. 5 is typically realized by executing a program (such as the physical simulation program 122, the image measurement program 126, the robot simulation program 130, and the integration program 134) by the processor 102 of the information processing device 100.

Referring to FIG. 5, the simulation device 1 includes, as its functional configurations, a virtual space information management module 150, a workpiece conveyance simulator 152, the workpiece behavior simulator 154, a virtual imaging module 156, the image measurement module 158, the robot simulator 160, a workpiece tracking module 162 and the visualizer 164.

The virtual space information management module 150 is realized by execution of the integration program 134 (FIG. 4), and manages the virtual space information 105 defining information such as the position and posture of each object of the virtual space where a simulation is carried out.

The workpiece conveyance simulator 152 corresponds to a third simulator which calculates the behavior of the workpiece conveyance device 10 applying an external force to one or multiple workpieces 4 whose behavior is calculated by the workpiece behavior simulator 154. The workpiece conveyance simulator 152 is realized by execution of the physical simulation program 122, and reproduces the behavior of the workpiece conveyance device 10 in accordance with the physical simulation parameter 124. More specifically, the workpiece conveyance simulator 152 reproduces the behavior of each of the workpiece supply part 12 and the workpiece conveyance part 14 that constitute the workpiece conveyance device 10. The information on the behavior of the workpiece conveyance device 10 calculated by the workpiece conveyance simulator 152 is reflected in the virtual space information 105.

The workpiece behavior simulator 154 corresponds to the first simulator that calculates the behavior of one or multiple workpieces 4 disposed in the virtual space. Specifically, the workpiece behavior simulator 154 is realized by execution of the physical simulation program 122, and calculates and updates, for each predetermined time step, the position and posture of each workpiece 4 disposed in the virtual space, in response to the information on the behavior of the workpiece conveyance device 10 from the workpiece conveyance simulator 152. In calculating the position and posture of each workpiece 4 for each time step, the workpiece behavior simulator 154 calculates the weight, position, posture, moving speed, moving direction or the like of each workpiece 4 for each time step. The position and posture of each workpiece 4 are calculated based on a workpiece parameter arbitrarily set by a user or the like. The information on the position and posture of the workpiece 4 calculated by the workpiece behavior simulator 154 is reflected in the virtual space information 105.

The virtual imaging module 156 corresponds to a virtual imaging part which manages the virtual camera disposed in the virtual space and generates a virtual image in response to a viewpoint position and a field of view of the virtual camera. The virtual imaging module 156 is realized by execution of the image measurement program 126, and generates a virtual image by imaging the virtual space by the virtual camera disposed at an arbitrary viewpoint position in the virtual space. The user is able to disposed the virtual camera at an arbitrary position, and is also able to arbitrarily change the field of view of the virtual camera.

The image measurement module 158 corresponds to the measurement part that carries out a measurement on the virtual image generated by imaging the virtual space by the virtual camera disposed at the arbitrary viewpoint position in the virtual space. The image measurement module 158 is realized by execution of the image measurement program 126, carries out the measurement defined by the image measurement parameter 128 on the virtual image from the virtual imaging module 156, and outputs a measurement result.

The robot simulator 160 corresponds to the second simulator that calculates, based on an operation command generated in response to a workpiece measurement result from the measurement part, the behavior of the robot 30 conveying the workpiece 4 disposed in the virtual space. More specifically, the robot simulator 160 is realized by execution of the robot simulation program 130, and reproduces the behavior of the robot 30 in response to the measurement result from the image measurement module 158. The information on the behavior of the robot 30 calculated by the robot simulator 160 is reflected in the virtual space information 105.

The workpiece tracking module 162 is realized by execution of the robot simulation program 130, and tracks the workpiece 4 picked and placed by the robot 30 in the virtual space based on the information on the behavior of the robot 30 from the robot simulator 160. The position information (workpiece position) of the workpiece 4 tracked by the workpiece tracking module 162 is reflected in the virtual space information 105.

The visualizer 164 corresponds to the image generation part that generates an image in which the virtual space is visualized. Based on the virtual space information 105 managed by the virtual space information management module 150, the visualizer 164 visualizes the behavior of each object (such as the workpiece conveyance device 10, the robot 30, and the workpiece 4) of the virtual space.

By the mutual cooperation between the functions as shown in FIG. 5, the behavior of a system (for example, the workpiece conveyance system 2) to be simulated can be reproduced with high precision.

E. Simulation Example

Next, one example of a simulation provided by the simulation device 1 according to the present embodiment will be described.

Figure 6:
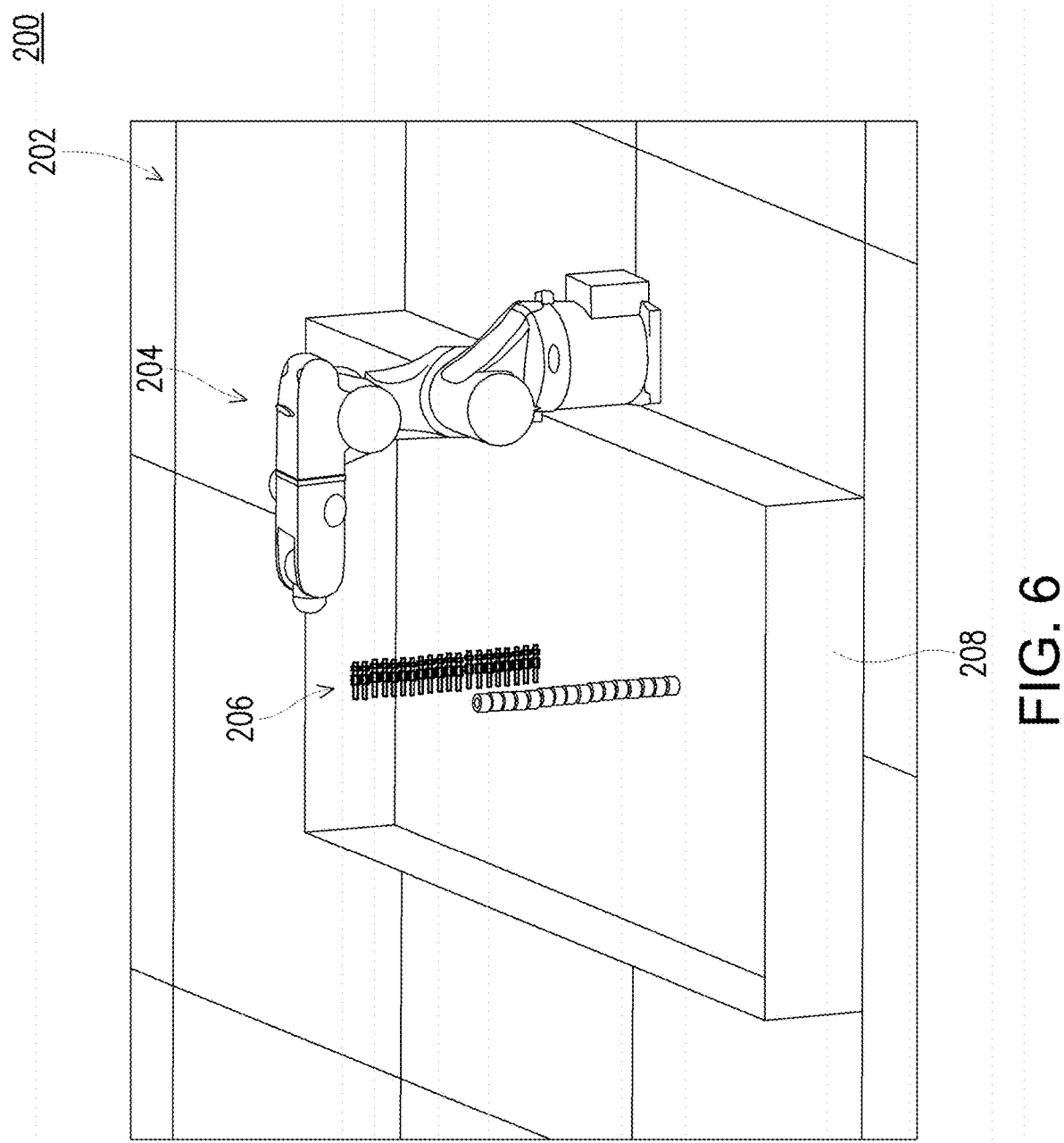
FIG. 6 shows one example of a display screen showing a virtual space where a result of a simulation executed by the simulation device according to the present embodiment is visualized.

FIG. 6 shows one example of a display screen 200 showing a virtual space where a result of a simulation executed by the simulation device 1 according to the present embodiment is visualized. Referring to FIG. 6, presented on the display screen 200 are a virtual space 202 where the simulation is executed, as well as an object 204 showing a robot disposed in the virtual space 202, an object 206 corresponding to multiple workpieces, and an object 208 showing the conveyance surface 16 of the workpiece conference device 10 in a simple manner.

Based on information (temporal change) on position and posture calculated for each time step by executing a simulation by the simulation device 1, these objects 204, 206 and 208 change position and posture. As a result, the objects 204, 206 and 208 are presented as if they are moving in the virtual space 202.

Figure 7:
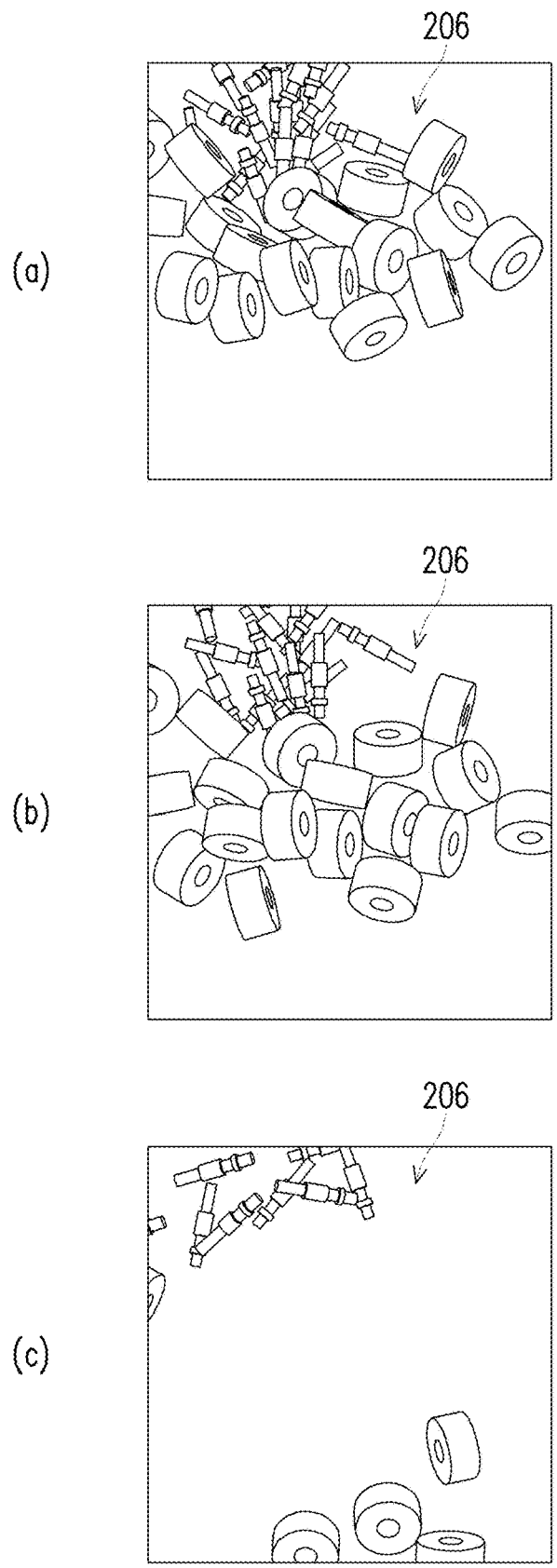
FIG. 7 shows one example of a temporal change of an object showing a workpiece in a result of a simulation executed by the simulation device according to the present embodiment.

FIG. 7 shows one example of a temporal change of the object 206 showing the workpiece 4 in a result of a simulation executed by the simulation device 1 according to the present embodiment. (a)~(c) of FIG. 7 show multiple bolts and nuts as the workpieces 4. In visualized results shown in (a)~(c) of FIG. 7, the position of the object 206 corresponding to each of the workpieces 4 changes with time.

In the present embodiment, by physical simulation, the position and posture of each workpiece 4 are calculated individually, and the influence of collision with other workpieces 4 or the like is also reflected. The trajectory of each of the workpieces 4 also changes depending on the mass of each of the workpieces 4 and the magnitude of external force applied thereto.

As a result, for example, as shown in (a)~(c) of FIG. 7, the workpieces 4, which were an aggregate to some extent in an initial state, become scattered as time passes. In this way, in the simulation device 1 according to the present embodiment, since the behavior of the workpiece 4 is calculated individually by physical simulation, a high-precision simulation can be realized.

Figure 8:
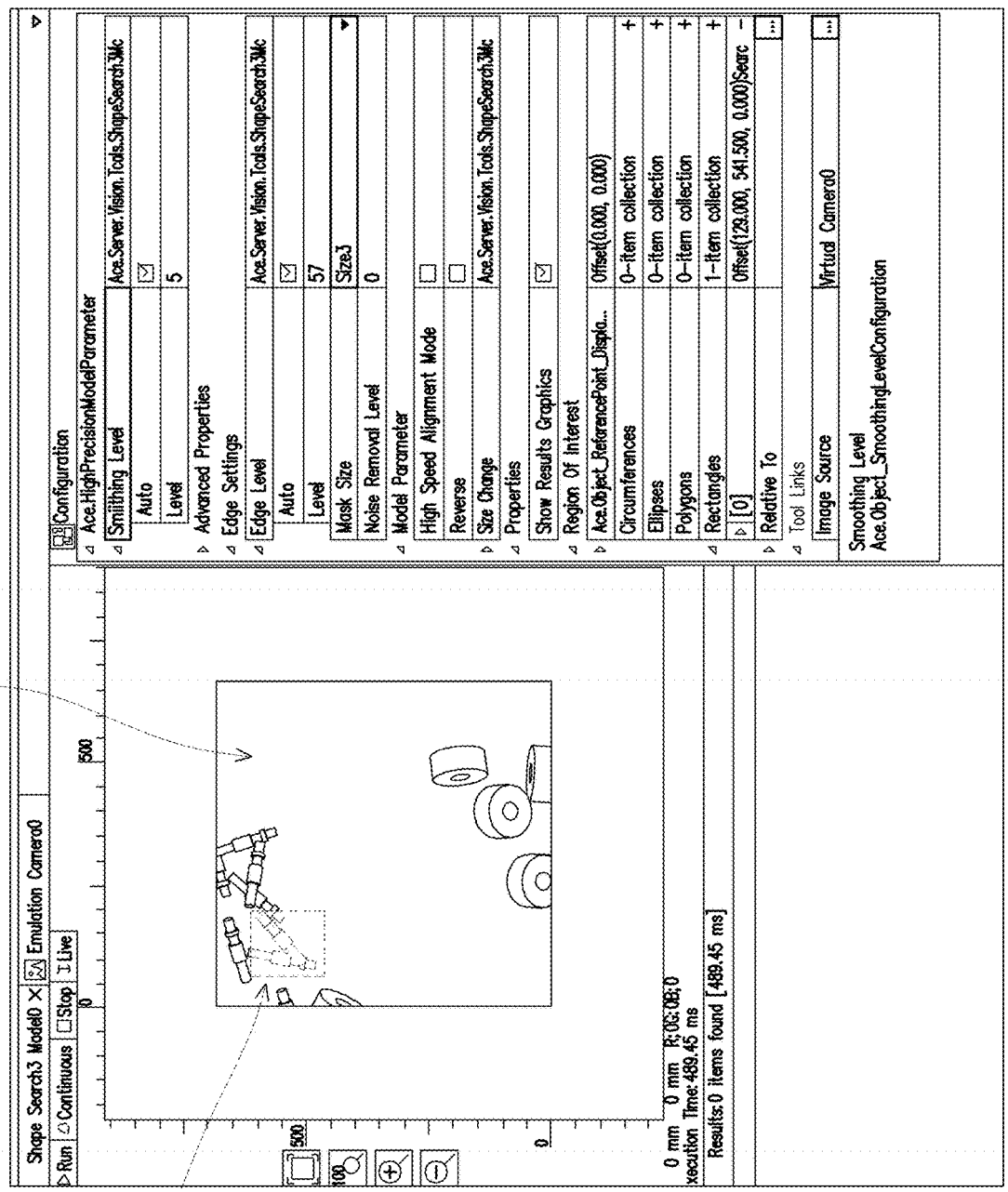
FIG. 8 shows one example of a display screen related to image measurement in a result of a simulation executed by the simulation device according to the present embodiment.

FIG. 8 shows one example of a display screen related to image measurement in a result of a simulation executed by the simulation device 1 according to the present embodiment. Referring to FIG. 8, a display screen 210 includes one example of a virtual image 220 to be subjected to the measurement by the image measurement module 158. In the virtual image 220, a recognition result 222 obtained by the measurement with respect to the virtual image 220 is displayed.

The display screen 210 includes a settings window 224 for setting the image measurement parameter 128 related to the measurement. The user is also able to set an arbitrary image measurement parameter 128 by operating the settings window 224. In regard to the details of the image measurement parameter 128, since those used for a general measurement can be adopted, each parameter will not be described in more detail.

Even if the system (for example, the workpiece conveyance system 2) to be simulated does not exist in reality, the user, by looking at the visualized results as shown in FIG. 6 to FIG. 8, is able to confirm the behavior of the system reproduced with high precision.

F. Physical Simulation

Next, the physical simulation adopted in the simulation device 1 according to the present embodiment will be described.

In the simulation device 1 according to the present embodiment, even in the case where multiple workpieces 4 are targeted, temporal behavior of each workpiece 4 can be calculated. If many workpieces 4 are present, the amount of calculation increases. Therefore, a known algorithm may be used to reduce the amount of calculation.

As one example of such an algorithm for reducing the amount of calculation, a Hierarchical Approximate Convex Decomposition (HACD) algorithm can be used. According to the HACD algorithm, by convex decomposition of an object being a physical simulation target, the object can be simplified without changing its shape, thereby accelerating physical calculation.

The physical simulation adopted in the simulation device 1 according to the present embodiment is capable of estimating the behavior of each of the workpieces 4. Further, the position or characteristic or the like of an arbitrary workpiece 4 can be arbitrarily changed at arbitrary time.

Figure 9:
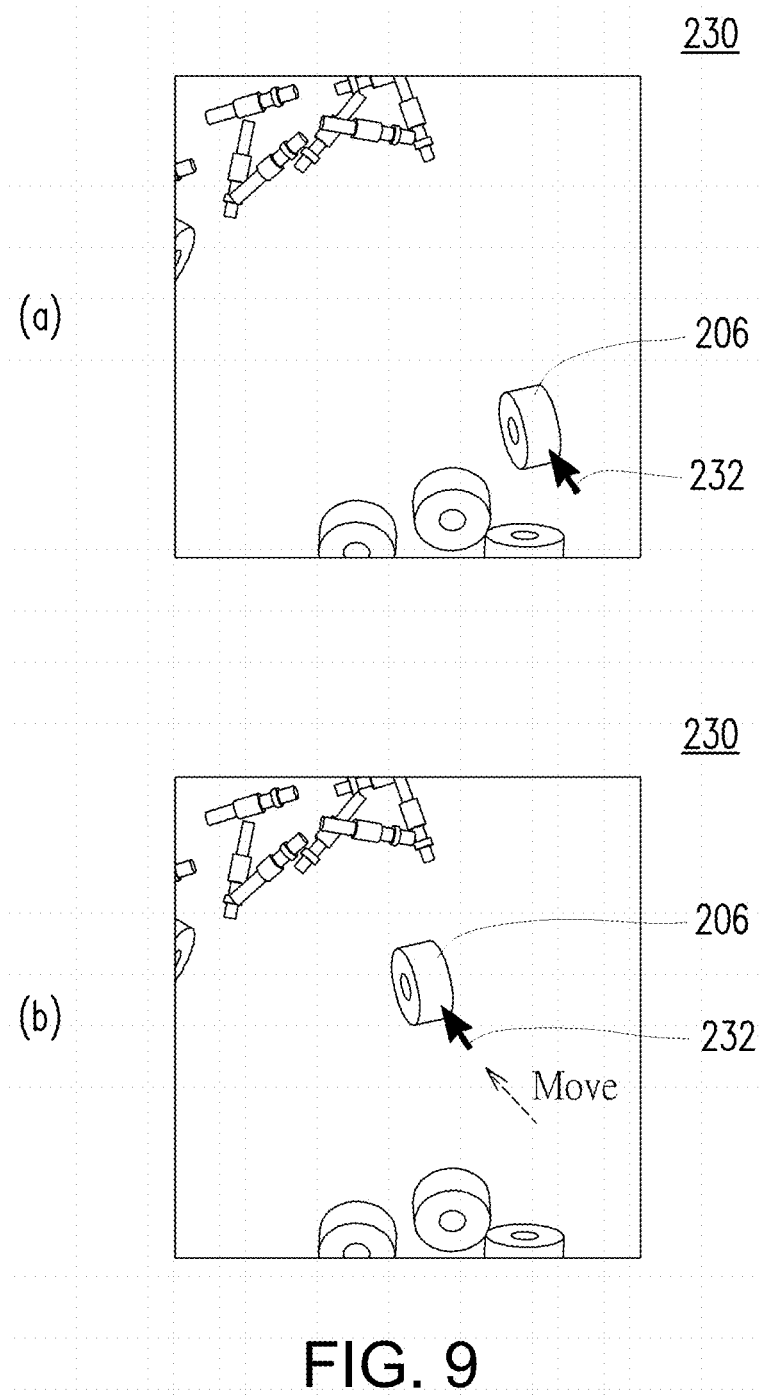
FIG. 9 shows one example of a physical simulation executed by the simulation device according to the present embodiment.

FIG. 9 shows one example of a physical simulation executed by the simulation device 1 according to the present embodiment. On a display screen 230 shown in (a) of FIG. 9, the object 206 corresponding to an arbitrary workpiece 4 can be selected by a cursor 232. The entire simulation may be paused by selection of an arbitrary object 206. At this time, as shown in (b) of FIG. 9, by disposing the selected object 206 at an arbitrary position by the cursor 232, the simulation can be restarted from the position where the object 206 is newly disposed.

That is, the workpiece behavior simulator 154 (first simulator) responds to a change operation on a position or characteristic of an arbitrary workpiece at arbitrary time, and continues to calculate the behavior of the one or multiple workpieces 4 in accordance with the position or characteristic after change.

In this way, in the physical simulation adopted in the simulation device 1 according to the present embodiment, since the behavior of an arbitrary workpiece 4 among multiple workpieces 4 can be changed at arbitrary time, by disposing an arbitrary workpiece 4 at an arbitrary position in the virtual space, the behavior of each device can be confirmed in advance.

G. Processing Procedure

Next, a processing procedure executed in the simulation device 1 according to the present embodiment will be described.

Figure 10:
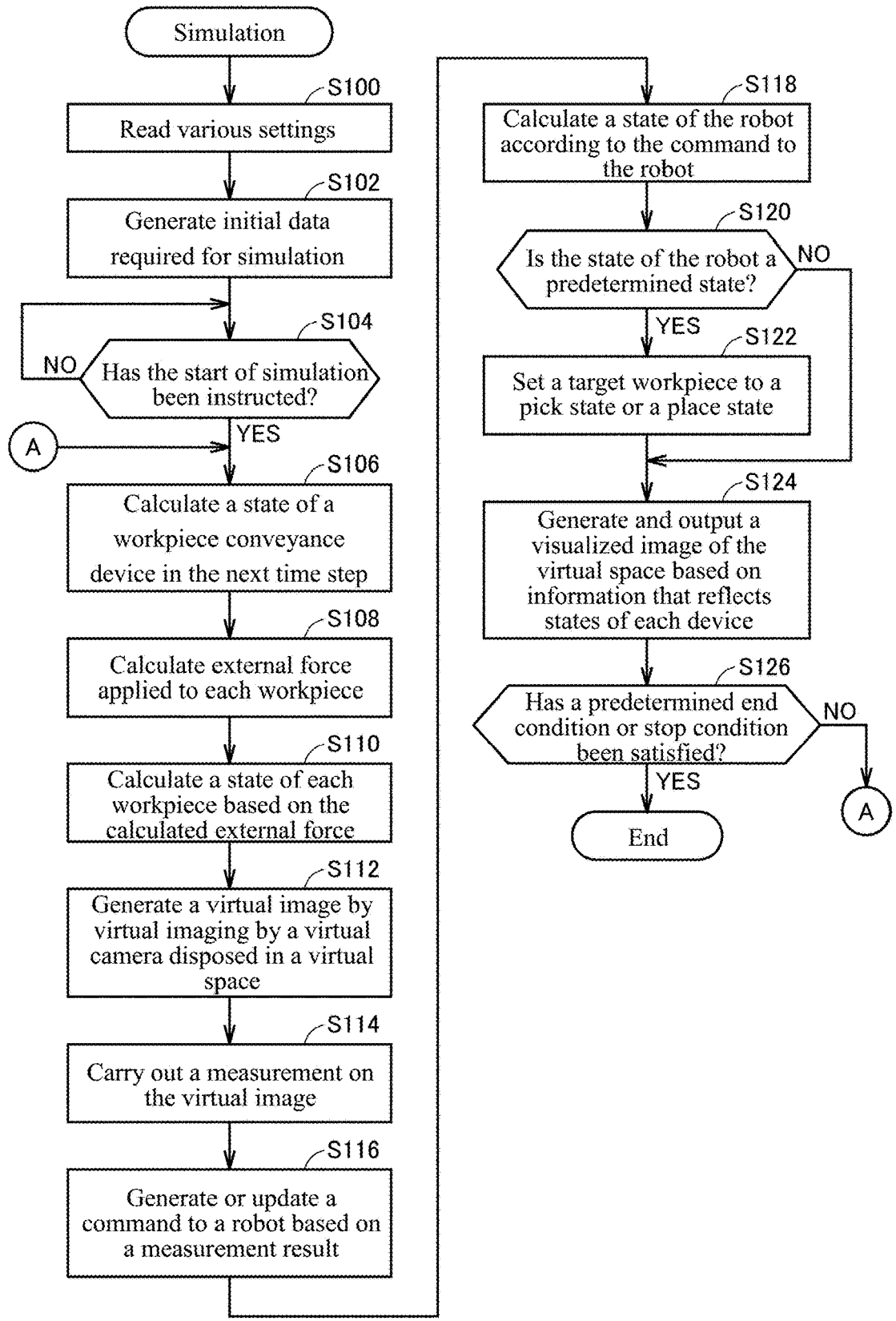
FIG. 10 is a flowchart showing a processing procedure executed in the simulation device according to the present embodiment.

FIG. 10 is a flowchart showing a processing procedure executed in the simulation device 1 according to the present embodiment. Each step shown in FIG. 10 is typically realized by executing a program (such as the physical simulation program 122, the image measurement program 126, the robot simulation program 130, and the integration program 134) by the processor 102 of the information processing device 100.

Referring to FIG. 10, firstly, the information processing device 100 reads various user-specified settings (the physical simulation parameter 124, the image measurement parameter 128, the robot parameter 132, CAD data, and other setting information) (step S100), and generates initial data required for simulation (step S102).

When the start of a simulation is instructed (YES in step S104), the information processing device 100 executes processing for calculating the behavior of one or multiple workpieces 4 disposed in a virtual space.

Specifically, the information processing device 100 calculates a state (such as position, speed, acceleration, and posture) of the workpiece conveyance device 10 in the next time step (step S106). Then, the information processing device 100 calculates an external force applied to each workpiece 4 based on the state of the workpiece conveyance device 10 in the next time step (step S108), and calculates a state (such as position, speed, acceleration, and posture) of each workpiece 4 based on the calculated external force (step S110).

The processing of steps S106 to S110 is typically provided by execution of the physical simulation program 122.

Subsequently, the information processing device 100 carries out a measurement on a virtual image generated by imaging the virtual space by a virtual camera disposed at an arbitrary viewpoint position in the virtual space. More specifically, the information processing device 100 generates the virtual image by virtual imaging by the virtual camera disposed in the virtual space (step S112), and carries out the measurement on the generated virtual image (step S114). The measurement includes processing such as a shape search for the virtual image. Then, the information processing device 100 generates or updates a command to a robot based on a measurement result obtained by the measurement (step S116).

The processing of steps S114 and S116 is provided by execution of the image measurement program 126.

Subsequently, the information processing device 100 executes processing for calculating, based on an operation command generated in response to a measurement result obtained by carrying out the measurement, the behavior of the robot 30 conveying the workpiece 4 disposed in the virtual space. More specifically, the information processing device 100 calculates a state (such as position, speed, acceleration, and posture) of the robot 30 in accordance with the command generated or updated for the robot in step S116 (step S118). In addition, if the calculated state of the robot 30 is in a predetermined state (pick position or place position) (step S120), the information processing device 100 sets the target workpiece 4 to a pick state or a place state (step S122).

The processing of steps S116 to S122 is provided by execution of the robot simulation program 130.

Finally, based on information (the virtual space information 105 that describes the state of the object of the virtual space) that reflects the state of each device calculated in the above steps, the information processing device 100 generates and outputs an image in which the virtual space is visualized (step S124).

The information processing device 100 determines whether a predetermined end condition or stop condition has been satisfied (step S126). If neither the predetermined end condition nor the predetermined stop condition has been satisfied (NO in step S126), the processing of step S106 and thereafter is repeated.

On the other hand, if the predetermined end condition or the predetermined stop condition has been satisfied (YES in step S126), the information processing device 100 ends the processing.

H. Application Example of Simulation Device

By using the simulation device 1 according to the present embodiment as described above, even in the case where an actual device does not exist (for example, before equipment installation or under construction), the optimum parameters can be adjusted in advance. In addition, it can also be used for cause analysis of a case where a robot stops due to a factory error or some kind of problem, or the like.

Hereinafter, as an application example of the simulation device 1 according to the present embodiment, an example of adjusting various parameters will be described. The image measurement parameter 128 is assumed as a target for such parameter adjustment. However, the other parameters may also serve as adjustment targets. Generally, with respect to image measurement, it is important to optimize the image measurement parameter 128 because the parameter value has a great influence on a recognition result.

As a method for adjusting such a parameter, by repeating the processing for changing the parameter value as appropriate and evaluating a result (for example, a conveyance rate or non-recognition rate of the workpiece 4 or the like) obtained by executing the above-mentioned simulation, the parameter with the best result can be determined as an optimum value.

Figure 11:
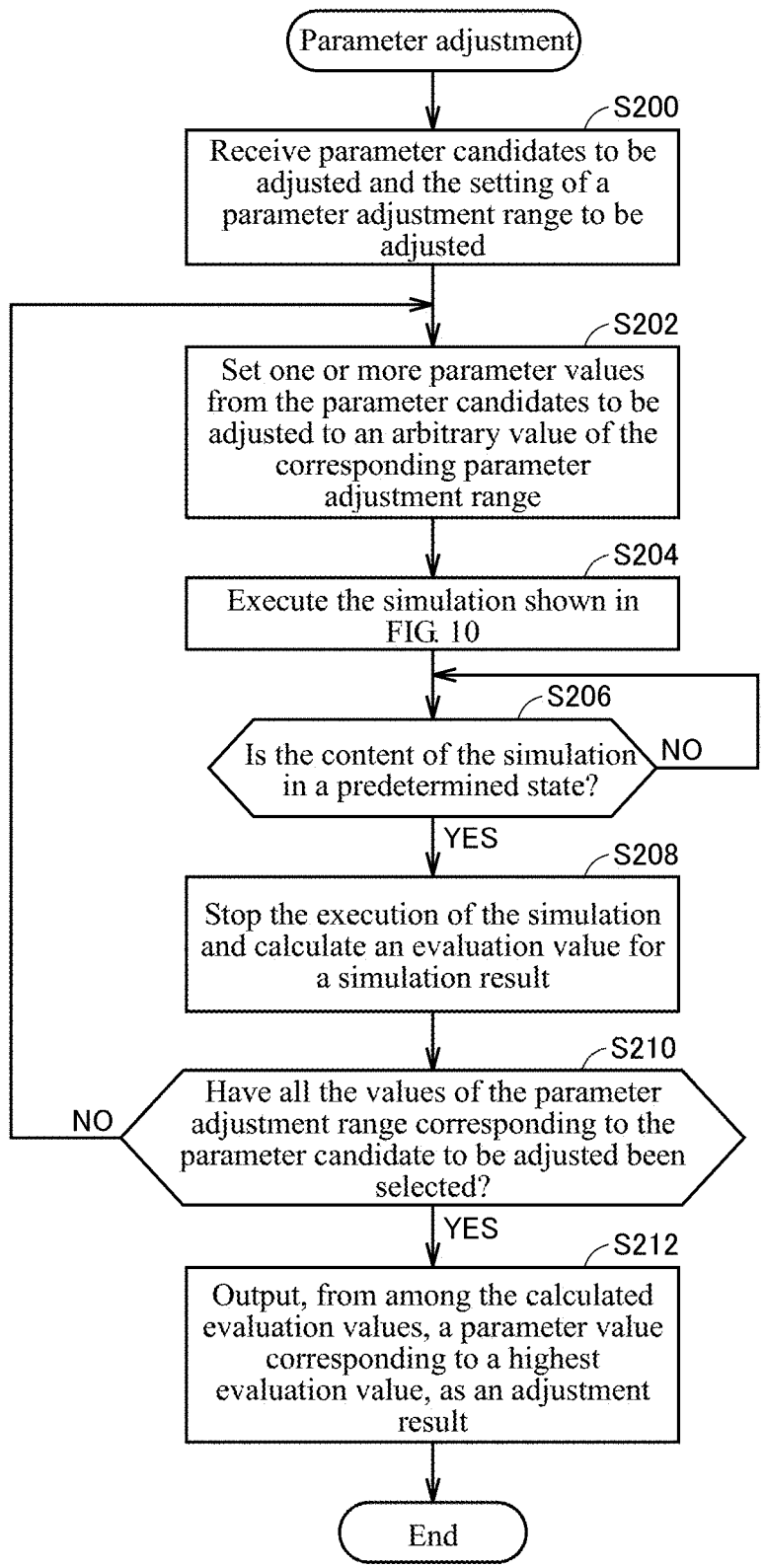
FIG. 11 is a flowchart showing a processing procedure related to parameter adjustment using the simulation device according to the present embodiment.

FIG. 11 is a flowchart showing a processing procedure related to parameter adjustment using the simulation device 1 according to the present embodiment. Each step shown in FIG. 11 is typically realized by executing a program (such as the physical simulation program 122, the image measurement program 126, the robot simulation program 130, and the integration program 134) by the processor 102 of the information processing device 100.

Referring to FIG. 11, the information processing device 100 receives parameter candidates to be adjusted and the setting of a parameter adjustment range to be adjusted (step S200). Then, the information processing device 100 sets one or multiple parameter values from the parameter candidates to be adjusted that are received in step S200 to an arbitrary value of the corresponding parameter adjustment range (step S202).

Then, the information processing device 100 executes the simulation shown in FIG. 10 based on the parameter after the setting in step S202 and other fixed parameters (step S204). When the content of the simulation is in a predetermined state (YES in step S206), the information processing device 100 stops the execution of the simulation and calculates an evaluation value for a result of the simulation (step S208).

Subsequently, with respect to the parameter candidates to be adjusted that are received in step S200, the information processing device 100 determines whether all the values of the corresponding parameter adjustment range have been selected (step S210). That is, it is determined whether all the parameter candidates to be adjusted that are received in step S200 are set to all the values of the set parameter adjustment range, and the execution of the simulation has been completed.

If not all the values of the corresponding parameter adjustment range have been selected (NO in step S210), the information processing device 100 repeats the processing of step S202 and thereafter.

In contrast, if all the values of the corresponding parameter adjustment range have been selected (YES in step S210), the information processing device 100 outputs, from among the evaluation values respectively calculated in step S208, a parameter value corresponding to a highest evaluation value, as an adjustment result (step S212). Then, the parameter adjustment processing ends.

The processing shown in the flowchart shown in FIG. 11 will be repeated many times depending on the number of the parameter candidates to be adjusted and the magnitude of the parameter adjustment range for each parameter candidate.

By using such parameter adjustment processing, it is possible to make a prior parameter adjustment even if an actual device does not exist.

I. Additional Remark

The present embodiment as described above includes the following technical concepts.

[Configuration 1]

A simulation device, including: a first simulator (154), calculating behavior of one or multiple workpieces (4) disposed in a virtual space (202); a measurement part (158), carrying out a measurement on a virtual image (220) generated by imaging the virtual space by a virtual camera disposed at an arbitrary viewpoint position in the virtual space; a second simulator (160), calculating, based on an operation command generated in response to a workpiece measurement result from the measurement part, behavior of a robot (30) conveying the workpieces disposed in the virtual space; and an image generation part (164), generating an image in which the virtual space is visualized.

[Configuration 2]

The simulation device described in Configuration 1, further including: a third simulator (152), calculating behavior of a workpiece conveyance device (10) applying an external force to the one or multiple workpieces (4) whose behavior is calculated by the first simulator.

[Configuration 3]

The simulation device described in Configuration 1 or 2, further including: a virtual imaging part (156), managing the virtual camera disposed in the virtual space, and generating the virtual image in response to the viewpoint position and a field of view of the virtual camera.

[Configuration 4]

The simulation device described in any one of Configurations 1 to 3, wherein the first simulator calculates and updates a position and a posture of each workpiece for each predetermined time step.

[Configuration 5]

The simulation device described in any one of Configurations 1 to 4, wherein the first simulator responds to a change operation on a position or characteristic of an arbitrary workpiece at arbitrary time, and continues to calculate the behavior of the one or multiple workpieces in accordance with the position or characteristic after change.

[Configuration 6]

A simulation program (122, 126, 130, 134) for causing a computer to execute a simulation, wherein the simulation program causes the computer (100) to execute: a step (S110) of calculating behavior of one or multiple workpieces disposed in a virtual space; a step (S114) of carrying out a measurement on a virtual image (220) generated by imaging the virtual space by a virtual camera disposed at an arbitrary viewpoint position in the virtual space; a step (S118) of calculating, based on an operation command generated in response to a measurement result obtained by carrying out the measurement, behavior of a robot conveying the workpieces disposed in the virtual space; and a step (S124) of generating an image in which the virtual space is visualized.

[Configuration 7]

A simulation method executed on a computer (100), wherein the simulation method is executed by the computer and includes: a step (S110) of calculating behavior of one or multiple workpieces disposed in a virtual space; a step (S114) of carrying out a measurement on a virtual image (220) generated by imaging the virtual space by a virtual camera disposed at an arbitrary viewpoint position in the virtual space; a step (S118) of calculating, based on an operation command generated in response to a measurement result obtained by carrying out the measurement, behavior of a robot conveying the workpieces disposed in the virtual space; and a step (S124) of generating an image in which the virtual space is visualized.

J. Advantages

The simulation device 1 in accordance with the present embodiment is capable of comprehensively simulating the behavior of a system in which some kind of external force is applied to a workpiece.

The embodiments disclosed herein are examples in all aspects and should not be interpreted as limitations. The scope of the present invention is indicated by claims instead of the above descriptions, and it is intended to include all modifications within the scope of the claims and the equivalents thereof.

What is claimed is:

1. A simulation device that simulates a state of one or more workpieces supplied by a workpiece supply part, comprising:
 a processor, configured to:
 calculate a state of a workpiece conveyance device, wherein the workpiece conveyance device includes the workpiece supply part and a conveyance surface, the workpiece conveyance device vibrates on a regular basis and applies an external force to each of the workpieces disposed on the conveyance surface to change a position and a posture of the each of the workpieces disposed on the conveyance surface;
 calculate, by physical simulation, the external force applied to each of the workpieces reflecting an influence of a collision with other workpiece based on the state of the workpiece conveyance device and calculates the state of the each of the workpieces based on mass of the each of the workpieces and the calculated external force, wherein the state of the each of the workpieces includes the position and the posture of the each of the workpieces; and generate virtual space information that reflects the state of the workpiece conveyance device and the state of the workpiece, wherein the processor calculates and updates, every predetermined time interval, the position and the posture of the workpiece disposed in a virtual space based on the calculated external force when a start of a simulation is instructed, wherein the processor generates an operation command to a robot based on the position and the posture of the workpiece, wherein the processor calculates, based on the operation command generated in response to a measurement result of the workpiece, a position and a posture of the robot conveying the workpiece disposed in the virtual space, and wherein the processor determines whether or not the calculated position and posture of the robot is in a predetermined state, and sets the workpiece to a pick state or a place state based on the predetermined state of the robot when the calculated position and posture of the robot is in the predetermined state.

2. The simulation device according to claim 1, wherein the processor generates an image in which a virtual space is visualized based on the virtual space information.

3. The simulation device according to claim 1, wherein the processor responds to a change operation on a position or characteristic of the workpiece at arbitrary time, and continues to calculate behavior of the workpiece in accordance with the position or characteristic after change.

4. A non-transitory computer readable recording medium storing a simulation program for causing a computer to execute a simulation of a state of one or more workpieces supplied by a workpiece supply part, wherein the simulation program causes the computer to execute:

a step of calculating a state of a workpiece conveyance device, wherein the workpiece conveyance device includes the workpiece supply part and a conveyance surface, the workpiece conveyance device vibrates on a regular basis and applies an external force to each of the workpieces disposed on the conveyance surface to change a position and a posture of the each of the workpieces disposed on the conveyance surface;

a step of calculating, by physical simulation, the external force applied to each of the workpieces reflecting an influence of a collision with other workpiece based on the state of the workpiece conveyance device and calculating the state of the each of the workpieces based on mass of the each of the workpieces and the calculated external force, wherein the state of the each of the workpieces includes the position and the posture of the each of the workpieces, and the step of calculating the state of the workpiece comprises:

a step of calculating and updating, every predetermined time interval, the position and the posture of the workpiece disposed in a virtual space based on the calculated external force when a start of a simulation is instructed;

a step of generating an operation command to a robot based on the position and the posture of the workpiece;

a step of calculating a position and a posture of the robot conveying the workpiece disposed in the virtual space based on the operation command generated in response to a measurement result of the workpiece;

a step of determining whether or not the calculated position and posture of the robot is in a predetermined state, and setting the workpiece to a pick state or a place state based on the predetermined state of the robot when the calculated position and posture of the robot is in the predetermined state; and a step of generating virtual space information that reflects the state of the workpiece conveyance device and the state of the workpiece.

5. The non-transitory computer readable recording medium according to claim 4, wherein the simulation program causes the computer to further execute:

a step of generating an image in which a virtual space is visualized based on the virtual space information.

6. The non-transitory computer readable recording medium according to claim 4, wherein the simulation program causes the computer to further execute:

a step of responding to a change operation on a position or characteristic of the workpiece at arbitrary time, and continuing to calculate behavior of the workpiece in accordance with the position or characteristic after change.

7. A simulation method of a state of one or more workpieces supplied by a workpiece supply part executed on a computer, wherein the simulation method comprises:

a step of calculating a state of the workpiece conveyance device, wherein the workpiece conveyance device includes the workpiece supply part and a conveyance surface, the workpiece conveyance device vibrates on a regular basis and applies an external force to each of the workpieces disposed on the conveyance surface to change a position and a posture of the each of the workpieces disposed on the conveyance surface;

a step of calculating, by physical simulation, the external force applied to each of the workpieces reflecting an influence of a collision with other workpiece based on the state of the workpiece conveyance device and calculating the state of the each of the workpieces based on mass of the each of the workpieces and the calculated external force, wherein the state of the each of the workpieces includes the position and the posture of the each of the workpieces, and the step of calculating the state of the workpiece comprises:

a step of calculating and updating, every predetermined time interval, the position and the posture of the workpiece disposed in a virtual space based on the calculated external force when a start of a simulation is instructed;

a step of generating an operation command to a robot based on the position and the posture of the workpiece;

a step of calculating a position and a posture of the robot conveying the workpiece disposed in the virtual space based on the operation command generated in response to a measurement result of the workpiece;

a step of determining whether or not the calculated position and posture of the robot is in a predetermined state, and setting the workpiece to a pick state or a place state based on the predetermined state of the robot when the calculated position and posture of the robot is in the predetermined state; and a step of generating virtual space information that reflects the state of the workpiece conveyance device and the state of the workpiece.

8. The simulation method according to claim 7 further comprises:

a step of generating an image in which a virtual space is visualized based on the virtual space information.

9. The simulation method according to claim 7 further comprises:
- a step of responding to a change operation on a position or characteristic of the workpiece at arbitrary time, and continuing to calculate behavior of the workpiece in accordance with the position or characteristic after change.

\* \* \* \* \*